(12) United States Patent
Al-Mayahi et al.

(10) Patent No.: US 7,823,396 B2
(45) Date of Patent: Nov. 2, 2010

(54) COOLING APPARATUS

(75) Inventors: Abdulsalam Al-Mayahi, Surrey (GB);
Adel Sharif, Guildford (GB)

(73) Assignee: Surrey Aquatechnology Limited,
Surrey (GB)

( * ) Notice: Subject to any disclaimer, the term of this patent is extended or adjusted under 35 U.S.C. 154(b) by 910 days.

(21) Appl. No.: 11/628,980

(22) PCT Filed: Jun. 10, 2005

(86) PCT No.: PCT/GB2005/002307

§ 371 (c)(1),
(2), (4) Date: Mar. 6, 2007

(87) PCT Pub. No.: WO2005/120688

PCT Pub. Date: Dec. 22, 2005

(65) Prior Publication Data

US 2007/0186574 A1 Aug. 16, 2007

(30) Foreign Application Priority Data

Jun. 11, 2004 (GB) .................. 0413110.8

(51) Int. Cl.
*F25D 17/02* (2006.01)
(52) U.S. Cl. .......................... 62/118; 62/310
(58) Field of Classification Search ............... 62/310, 62/286, 259.4, 487, 118; 43/168; 210/500.21, 210/520, 625; 95/52; 165/907
See application file for complete search history.

(56) References Cited

U.S. PATENT DOCUMENTS 4,981,594 A   1/1991   Jones
5,281,430 A   1/1994   Herron et al.
5,616,307 A * 4/1997   Dubin et al. ................ 423/235
6,379,548 B1  4/2002   Kurokawa et al.
6,557,266 B2* 5/2003   Griffin ........................ 34/168
6,672,099 B1* 1/2004   Yoshimi et al. ............... 62/467

FOREIGN PATENT DOCUMENTS

JP    09060320    3/1997
JP    2002310595  10/2002
WO    02060825    8/2002

OTHER PUBLICATIONS

A translation of JP 9-60320 A to Hanada et al.*
English Abstract of JP 9060320.
English Abstract of JP 2002310595.

* cited by examiner

*Primary Examiner*—Mohammad M Ali
(74) *Attorney, Agent, or Firm*—Whyte Hirschboeck Dudek SC

(57) ABSTRACT

A process for introducing a solution into an evaporative cooling apparatus (14), said process comprising a) positioning a selectively permeable membrane (16) between a first solution (18) and a second solution (20) having a higher solute concentration than the first solution (18), such that the solvent from the first solution (18) flows across the selectively permeable membrane (16) to dilute the second solution (20), b) introducing the second solution into an evaporative cooling apparatus (14) in which solvent is removed from the second solution (20) by evaporation, and c) recycling the second solution (20) from step b) to step a) to draw solvent from the first solution (18).

15 Claims, 2 Drawing Sheets

COOLING APPARATUS

BACKGROUND OF THE INVENTION

1. Field of the Invention

The present invention relates to a method and apparatus for introducing a solution into a cooling apparatus. In particular, although not exclusively, the present invention relates to a method and apparatus for removing heat from a heat source.

2. The Prior Art

Heat exchangers are often used to remove excess heat from industrial processes. Typical heat exchangers include shell and tube-type heat exchangers, which comprise a length of tubing partially enclosed within a housing or shell. An industrial process stream containing excess heat is introduced into the tubing, whilst a coolant, such as water, is passed through the shell via a separate inlet and outlet. The water removes excess heat from the process stream. Thus, the water exiting the shell is at a higher temperature than the coolant entering the shell. The heated water stream is cooled in a cooling tower before it is recirculated back through the shell. In this way, heat removal can be carried out in a continuous manner.

Most cooling towers contain a porous filler material, known as decking (packing). Water is introduced into the top of the cooling tower and drips down through the decking, whilst air is blown through the decking, causing some of the water to evaporate. The loss of heat by evaporation (evaporative cooling) lowers the remaining water temperature. The cooled water is recirculated to the heat exchanger.

As evaporation occurs, contaminants, such as dissolved solids, build up in the recirculating water. Such contaminants can cause fouling, for example, as a result of biological growth, scale formation, corrosion and/or sludge deposition. The contaminant level may be reduced by removing a portion of the recirculating water from the system. The removal of water in this manner is known as blowdown.

To replace the total water loss from the system, make-up water is introduced. The make-up water is treated with, for example, scale inhibitors, corrosion inhibitors, biocides and dispersants. These additives tend to be expensive and have to be added continuously to the make-up water, adding to the cost of the overall process.

The water quality of the cooling system has a significant effect on the thermal efficiency and life of the cooling tower and heat exchangers.

In an air-cooler, warm air from the surroundings is blown through wet decking or packing material. Heat from the air is transferred to the wet decking material, causing the water contained in the decking to evaporate. As a result, air emerging from the cooler is at a lower temperature than air introduced into the cooler. As the water evaporates, contaminants in the water may deposit on the decking material. Such deposits have a detrimental effect on the thermal efficiency and life of the air-cooler.

SUMMARY OF THE INVENTION

According to the present invention, there is provided a process for introducing a solution into an evaporative cooling apparatus, said process comprising a) positioning a selectively permeable membrane between a first solution and a second solution having a higher solute concentration than the first solution, such that the solvent from the first solution flows across the selectively permeable membrane to dilute the second solution, b) introducing the second solution into an evaporative cooling apparatus in which solvent is removed from the second solution by evaporation, and c) recycling the second solution from step b) to step a) to draw solvent from the first solution.

Preferably, the evaporative cooling apparatus is a cooling tower or an air-cooler. Suitable air-coolers include air-coolers for domestic and industrial use.

The selective nature of the membrane prevents undesirable solute(s) and other containments in the first solution from passing into the second solution.

The first solution may be an impure aqueous stream, such as seawater, brackish water, river water and waste streams from, for example, an industrial or agricultural process. When such solutions are used, water is selectively allowed to pass across the membrane to dilute the second solution.

The second solution may comprise seawater, brackish water and industrial process streams. Suitable industrial process streams may be derived from, for example, the salty residues of desalination plants, such as thermal desalination and/or reverse osmosis plants, and aqueous effluents, such as those typically employed as make-up water for conventional cooling towers. The seawater, brackish water and industrial process streams employed may be concentrated prior to use. Alternatively or additionally, the seawater, brackish water and/or industrial process streams employed may be concentrated during the course of the process of the present invention, such that the solution in contact with the membrane in step a) has a higher solute (total dissolved salts) concentration than the first solution. For example, the evaporative cooling apparatus may be employed to remove solvent from the second solution by evaporation to produce a concentrated second solution that can be used to draw solvent from the first solution in step a). By recycling the second solution between steps a) and b) in a closed loop, solutes dissolved in the second solution may be "immobilised". Thus, it may be possible to recycle industrial process streams containing, for example, undesirable impurities, such as toxic and radioactive materials in such a closed loop which isolates the impurities from the surrounding environment.

When seawater, brackish water and industrial process streams are used as the second solution, it is desirable to add additives, such as scale inhibitors, corrosion inhibitors, biocides and dispersants to reduce or avoid fouling and corrosion in the process. These additives may be "immobilised" in the system when the second solution is recycled between steps a) and b) in a closed loop. Thus, it may not be necessary to continuously add such additives to the second solution.

The second solution may have a known composition. For example, in one embodiment, the second solution is formed by introducing a known quantity of a solute into a known quantity of solvent. Thus, the second solution may consist essentially of a selected solute dissolved in a selected solvent. This second solution may be formed prior to step a). By forming the second solution in this manner, a substantially clean solution may be produced. Thus, the second solution may have a reduced concentration of suspended particles, biological matter and/or other components that may cause fouling of the cooling system. More preferably, the second solution is substantially free of such components. In one embodiment, additives such as scale inhibitors, corrosion inhibitors, biocides and/or dispersants are included in the second solution. The second solution may be recirculated in a closed-loop, for example, such that it is continuously reused in steps a) and b). In such an embodiment, the components of the second solution are effectively "immobilised" within the loop. Thus, once the second solution is formed, further addition of solute and/or additives such as scale inhibitors, corrosion inhibitors, biocides and/or dispersants may not be necessary.

The solvent in the second solution is preferably water.

The solute (osmotic agent) in the second solution is preferably a water-soluble solute, such as a water-soluble salt. Suitable salts include salts of ammonium and metals, such as alkali metals (e.g. Li, Na, K) and alkali earth metals (e.g. Mg and Ca). The salts may be fluorides, chlorides, bromides, iodides, sulphates, sulphites, sulphides, carbonates, hydrogencarbonates, nitrates, nitrites, nitrides, phosphates, aluminates, borates, bromates, carbides, chlorides, perchlorates, hypochlorates, chromates, fluorosilicates, fluorosilicates, fluorosulphates, silicates, cyanides and cyanates. One or more salts may be employed. In a preferred embodiment, the solute of the second solution is a sodium and/or potassium salt. Thus, the second solution may be formed by dissolving a known amount of a sodium and/or potassium salt in water. In one embodiment, the second solution is formed by dissolving a sodium chloride in water. In a further preferred embodiment the second solution may be a solution of ammonia and carbon dioxide, with resultant aqueous species: ammonium carbonate, ammonium bicarbonate and ammonium carbamates (see WO 02/0608025). The second solution initially used in step a) may have a solute or total dissolved salts (TDS) concentration that is higher than the solute or TDS concentration of the first solution.

In step a) of the present invention, the first solution is placed on one side of a semi-permeable membrane. A second solution having a higher solute concentration (and, therefore, a lower solvent concentration) is placed on the opposite side of the membrane. As a result, solvent passes across the membrane from the side of low solute concentration (high solvent concentration) to the side of high solute concentration (low solvent concentration). The flow occurs along a concentration gradient. Thus, high pressures are not required to induce solvent flow. However, a pressure differential across the membrane may be applied, for example, to increase the flux of water.

After solvent (e.g. water) from the first solution has passed into the second solution, the second solution may be at an elevated pressure (osmotic pressure when water is used as a solvent), even when a pressure is not applied to induce solvent flow from the first solution to the second solution. This is because the flow of solvent from the first solution into the second solution occurs along a concentration gradient. This pressure may be used to aid the transfer of the second solution to subsequent processing steps of the present invention. This pressure may be sufficient to transfer the second solution to subsequent processing steps, for example, without the aid of pumps. In one embodiment, excess pressure is converted into mechanical work. Thus, the pressure (e.g. osmotic pressure) generated in the second solution may be used to reduce the power consumption and/or increase the heat transfer efficiency of the overall process.

In one embodiment, the diluted second solution from step a) may be contacted with one side of a further selectively permeable membrane, whilst a third solution having a higher solute concentration than the diluted second solution is contacted with the other side of the membrane. As the second solution has a higher solvent concentration than the third solution, solvent from the second solution flows across the membrane to dilute the third solution. Like the second solution, the third solution may consist essentially of a selected solute dissolved in a selected solvent. Thus, by repeating steps (a) one or more times, the composition of the solution introduced into the cooling tower may be better controlled.

The third and/or subsequent solution may be formed of any of the solutions described above in relation to the second solution. Thus, the solvent in the third and/or subsequent solution is preferably water.

The solute (osmotic agent) in the third and/or subsequent solution is preferably a water-soluble solute, such as a water-soluble salt. Suitable salts include salts of ammonium and metals, such as alkali metals (e.g. Li, Na, K) and alkali earth metals (e.g. Mg and Ca). The salts may be fluorides, chlorides, bromides, iodides, sulphates, sulphites, sulphides, carbonates, hydrogencarbonates, nitrates, nitrites, nitrides, phosphates, aluminates, borates, bromates, carbides, chlorides, perchlorates, hypochlorates, chromates, fluorosilicates, fluorosilicates, fluorosulphates, silicates, cyanides and cyanates. One or more salts may be employed. In a preferred embodiment, the solute of the third and/or subsequent solution is a sodium and/or potassium salt. Thus, the third and/or subsequent solution may be formed by dissolving a known amount of a sodium and/or potassium salt in water. In one embodiment, the third and/or subsequent solution is formed by dissolving a sodium chloride in water. In another embodiment the third/and or subsequent solution may be a solution of ammonia and carbon dioxide, with resultant aqueous species: ammonium carbonate, ammonium bicarbonate and ammonium carbamates (see WO 02/060825).

The third and/or subsequent solution may be contain the same solute(s) and solvent(s) as the second solution. It may also be possible to use different solutions as the second, third and/or subsequent solutions.

In one embodiment, additives such as scale inhibitors, corrosion inhibitors, biocides and/or dispersants are included in the third and/or subsequent solution. As will be described in further detail below, the third and/or subsequent solution may be recirculated in a closed-loop, for example, such that it is continuously reused in steps a) and b). In such an embodiment, the components of the third and/or subsequent solution are effectively "immobilised" within the loop. Thus, once the third and/or subsequent solution is formed, further addition of solute and/or additives such as scale inhibitors, corrosion inhibitors, biocides and/or dispersants may not be necessary.

In step b), the second solution is introduced into an evaporative cooling apparatus. The cooling apparatus preferably comprises supporting material from which solvent (e.g. water) can evaporate. The supporting material is preferably porous and may advantageously have a large surface area. The supporting material may be made from plastic, metal, ceramic and natural materials, such as wood.

In use, the second solution is contacted with the supporting material. A gas, such as air, may then be passed through the wet supporting material causing the solvent of the second solution to evaporate. Depending on the relative temperatures of the solution and the gas, the temperature of either the solution or the gas is reduced as a result of the evaporative cooling. The cooled solution or gas may be used as a coolant, for example, to remove heat from a heat source or to cool the surrounding atmosphere.

Solution emerging from step b) is recycled in step a). The second solution from step b) may be directly recycled to step a) to draw the solvent from the first solution. Alternatively, the second solution may be recycled to step a) after one or more intermediate steps. For example, the second solution from step b) may be used to remove heat from a heat source prior to being recycled to step a). In one embodiment, the second solution is used as a coolant in a heat exchanger prior to being recycled to step a). It may be possible to recirculate the second solution, for example, in a closed loop. Optionally, additional components, such as solvents, solutes and additives selected from, for example, scale inhibitors, corrosion inhibitors, biocides and/or dispersants may be added to the closed loop.

Examples of suitable evaporative cooling apparatuses include cooling towers and air-coolers, such as air-coolers for domestic and industrial use.

Air-coolers typically comprise a housing containing a porous filler material (e.g. decking or packing). The second solution is introduced into the air-cooler and wets the filler material. When warm air from the surroundings is blown through the filler material, some of the solvent (e.g. water) of the second solution evaporates. The loss of heat by evaporation (evaporative cooling) lowers the temperature of the air. Thus, the temperature of the air emerging from the air-cooler is lower than that of the air introduced into the air-cooler. The air emerging from the air cooler may be used as a coolant for, for example, a heat exchanger. Alternatively, the emerging air may be used to cool an enclosed space, such as a room.

Cooling towers typically contain a porous filler material, known as decking (packing). The second solution is introduced into the top of the cooling tower and drips down through the decking, whilst a coolant, such as air, is blown through the decking, causing some of the solvent of the second solution to evaporate. The loss of heat by evaporation (evaporative cooling) lowers the temperature of the remaining second solution.

As evaporation occurs, the concentration of the second solution increases. If contaminants are present in the second solution, they may be at least partially removed by removing a portion of the second solution entering the cooling tower (e.g. as a bleed). This removal is known as blowdown.

Any suitable cooling tower may be employed in the process of the present invention. Examples of suitable cooling towers include natural draft and mechanical draft cooling towers.

After step a), the second solution may be used to remove excess heat from a heat source (step d). Thus, according to a preferred embodiment of the present invention, the present invention provides a method for removing heat from a heat source. Step d) may be carried out before and/or after the second solution is introduced into the evaporative cooling apparatus in step b) provided that the second solution used in step (d) is at a lower temperature than the heat source. In one embodiment, step d) is carried out before and/or after the second, solution is cooled in a cooling tower in step b).

In one embodiment, the second solution is used as a coolant in a heat exchanger to remove heat from an industrial process stream, such as steam from a power plant. For example, the heat exchanger may be a shell-and-tube-type heat exchanger, which comprises a length of tubing partially enclosed within a housing or shell. The industrial process stream is introduced into the tubing, whilst the second solution is passed through the shell via a separate inlet and outlet. The second solution removes excess heat from the process stream. Thus, the second solution exiting the shell is at a higher temperature than the second solution entering the shell.

Once the second solution has been heated in the heat removal step (d), it may be reused in step a). However, if the second solution is reused in step a), the overall concentration of solute in the second solution in contact with the selectively permeable membrane should be higher than the concentration of solute in the first solution, so that solvent from the first solution will pass across the selectively permeable membrane into the second solution. In a preferred embodiment, therefore, the removal of solvent from the second solution is controlled to ensure that the second solution in contact with the selectively permeable membrane has a desired concentration.

In one embodiment, the second solution may be cooled prior to reuse in step a) (e.g. in a cooling tower).

In step c), the solution used in steps a), b) and, optionally, d) may be recirculated in a closed loop. Optionally, additional components, such as solvents, solutes and additives selected from, for example, scale inhibitors, corrosion inhibitors, biocides and/or dispersants may be added to the closed loop.

Any suitable selectively membrane may be used in the process of the present invention. An array of membranes may be employed. Suitable membranes include cellulose acetate (CA) and cellulose triacetate (CTA) (such as those described in McCutcheon et al., Desalination 174 (2005) 1-11) and polyamide (PA) membranes. The membrane may be planar or take the form of a tube or hollow fibre. Thin membranes may be employed, particularly when a high pressure is not applied to induce solvent flow from the first solution to the second solution. If desired, the membrane may be supported on a supporting structure, such as a mesh support.

In one embodiment, one or more tubular membranes may be disposed within a housing or shell. The first solution may be introduced into the housing, whilst the second solution may be introduced into the tubes. As the solvent concentration of the first solution is higher than that of the second, solvent will diffuse across the membrane from the first solution into the second solution. Thus, the second solution will become increasingly diluted and the first solution, increasingly concentrated. The diluted second solution may be recovered from the interior of the tubes, whilst the concentrated first solution may be removed from the housing.

When a planar membrane is employed, the sheet may be rolled such that it defines a spiral in cross-section.

The pore size of the membrane may be selected depending on the size of the solvent molecules that require separation. It may be possible to use a membrane having a pore size that allows two or more different types of solvent molecules to pass through the membrane. Preferably, the pore size of the membrane is selective to the passage of water. The pore size of the membrane is preferably selected to prevent the flow of solute and other contaminants from the first solution to the second solution. Typical pore sizes range from 1 to 100 Angstroms, preferably 5 to 50 Angstroms, for example 10 to 40 Angstroms.

The flow of solvent across a selectively membrane is generally influenced by thermal conditions. Thus, the solutions on either side of the membrane may be heated or cooled, if desired. The solutions may be heated to higher temperatures of 40 to 90° C., for example, 60 to 80° C. Alternatively, the solutions may be cooled to −20 to 40° C., for example, 5 to 20° C. The solution on one side of the membrane may be heated, while the other side cooled. The heating or cooling may be carried out on each solution independently. Chemical reactions may also be carried out on either side of the membrane, if desired.

To improve the efficacy of the osmosis step, the first and/or second solution may be treated to reduce fouling and scaling of the membrane. Accordingly, anti-scaling and/or anti-fouling agents may be added to one or both solutions. Although not required, pressure may be applied to the first solution side of the membrane to increase the rate of flux of water across the membrane. For example, pressures of $1\times10^5$ Pa to $5\times10^5$ Pa [1 to 5 bar] may be applied, preferably pressures of $2\times10^5$ Pa to $4\times10^5$ Pa [2 to 4 bar]. Additionally or alternatively, the pressure on the second solution side of the membrane may be reduced. For example the pressure may be less than $1\times10^5$ Pa [1 bar], preferably less than $0.5\times10^5$ Pa [0.5 bar].

The viscosities of the first solution and/or the second solution may also be modified to improve the rate of flux across the membrane. For example, viscosity modifying agents may be employed.

The process of the present invention may further comprise a, pre-treatment step of removing contaminants, such as suspended particles and biological matter, from the first solution. Additionally or alternatively, a threshold inhibitor to control scaling may be added to the first solution. Pre-treatment steps to alter the pH of the first solution may also be employed. When seawater is used as a feed, it is preferable to use a deep sea intake, as deep seawater typically contains fewer contaminants.

According to a further embodiment of the present invention, there is provided an apparatus for introducing a solution into an evaporative cooling apparatus, said apparatus comprising a housing comprising a selectively permeable membrane for separating a first solution from a second solution having a higher solute concentration than the first solution, said membrane being configured to selectively allow solvent to pass from the first solution-side of the membrane to the second solution-side of the membrane, an evaporative cooling apparatus, and means for removing second solution from the housing, and means for introducing the second solution into the evaporative cooling apparatus.

The apparatus of the present invention may further comprise a heat exchanger.

These and other aspects of the present invention will now be described with reference to the accompanying drawings, in which:

DETAILED DESCRIPTION OF THE PREFERRED EMBODIMENTS

Figure 1:
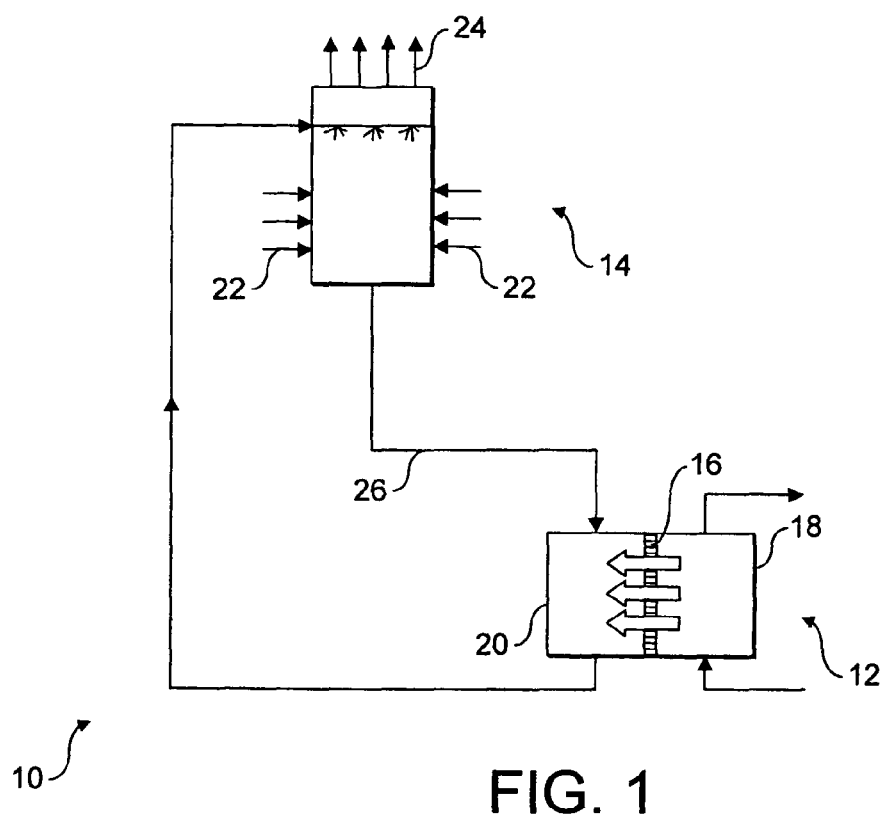
FIG. 1 is a schematic diagram of an apparatus according to a first embodiment of the present invention.

Referring to FIG. 1, there is provided an apparatus 10 for producing a cool stream of air.

The apparatus 10 comprises a housing 12 and an air cooler 14. The housing 12 comprises a selectively permeable membrane 16 for separating seawater 18 from a solution 20 formed by dissolving a known amount of sodium chloride in water.

In use, seawater 18 is circulated through the housing 12 on one side of the membrane 16, whilst sodium chloride solution 20 is circulated through the housing 12 on the opposite side of the membrane 16. The sodium chloride solution 20 in contact with the membrane 16 has a higher total dissolved salt (solute) concentration than the seawater 18. Thus, water flows from the seawater-side of the membrane 16 to the solution-side of the membrane 16 by osmosis.

The flow of water across the membrane 16 dilutes the sodium chloride solution 20. The diluted solution 20 is removed from the housing 12 and is introduced into the air cooler 14. The air cooler 14 contains a porous filler material (not shown). The solution 20 is introduced into the top of the air cooler 14 and wets the porous material.

When warm air 22 from the surroundings is blown through the wet porous material, heat from the air 22 is transferred to the wet porous material, causing water in the solution 20 to evaporate. As a result, the air 24 emerging from the cooler 14 is at a lower temperature than the air 22 introduced into the cooler 14. The emerging air 24 may be used to cool an enclosed space, such as a room.

As water evaporates from the solution 20, the solution 20 becomes more concentrated. This concentrated solution 20 is removed from the air cooler 14 via line 26 and recirculated to the solution-side of the membrane 16 in housing 12 in a closed loop. The concentration of the solution 20 in contact with the membrane 16 is higher than that of the seawater 18 on the other side of the membrane 16.

Figure 2:
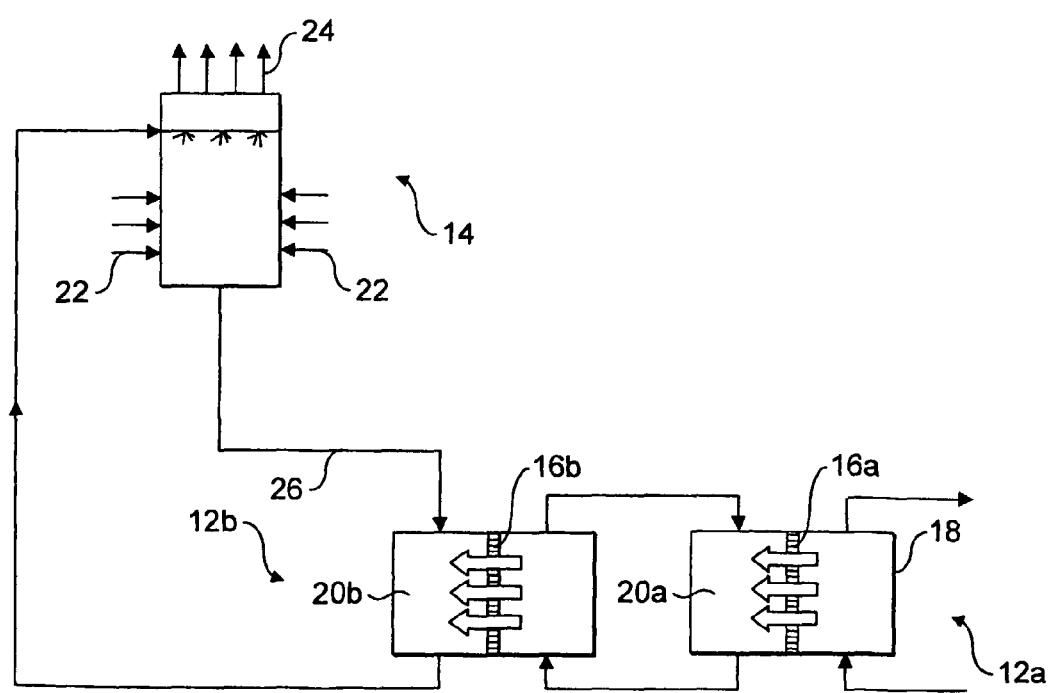
FIG. 2 is a schematic diagram of an apparatus according to a second embodiment of the present invention.

The apparatus of FIG. 2 is similar to the apparatus of FIG. 1. Thus, like numerals have been used to designate like parts. Unlike the apparatus of FIG. 1, however, the apparatus of FIG. 2 comprises two housings 12a and 12b are used in series.

The first housing 12a comprises a selectively permeable membrane 16a for separating seawater 18 from a solution 20a formed by dissolving a known amount of sodium chloride in water. The second housing 12b comprises a selectively permeable membrane 16b for separating solution 20a from the first housing 12a from a solution 20b formed by dissolving a known amount of sodium chloride in water.

In use, seawater 18 is circulated through the housing 12a on one side of the membrane 16a, whilst sodium chloride solution 20a is circulated through the housing 12a on the opposite side of the membrane 16a. The sodium chloride solution 20a in contact with the membrane 16 has a higher total dissolved salt (solute) concentration than the seawater 18. Thus, water flows from the seawater-side of the membrane 16 to the solution-side of the membrane 16 by osmosis.

The flow of water across the membrane 16a dilutes the sodium chloride solution 20a. The diluted solution 20a is circulated through the housing 12b on one side of the membrane 16b, whilst sodium chloride solution 20b is circulated through the housing 12b on the opposite side of the membrane 16b. The sodium chloride solution 20b in contact with the membrane 16b has a higher total dissolved salt (solute) concentration than the solution 20a. Thus, water flows across the membrane 16b by osmosis to dilute the sodium chloride solution 20b. The diluted solution 20b is introduced into an air cooler 14 in the manner described with reference to FIG. 1. As water flows across the membrane by osmosis, the sodium chloride solution 20a becomes increasingly concentrated and this is recirculated to housing 12a.

Figure 3:
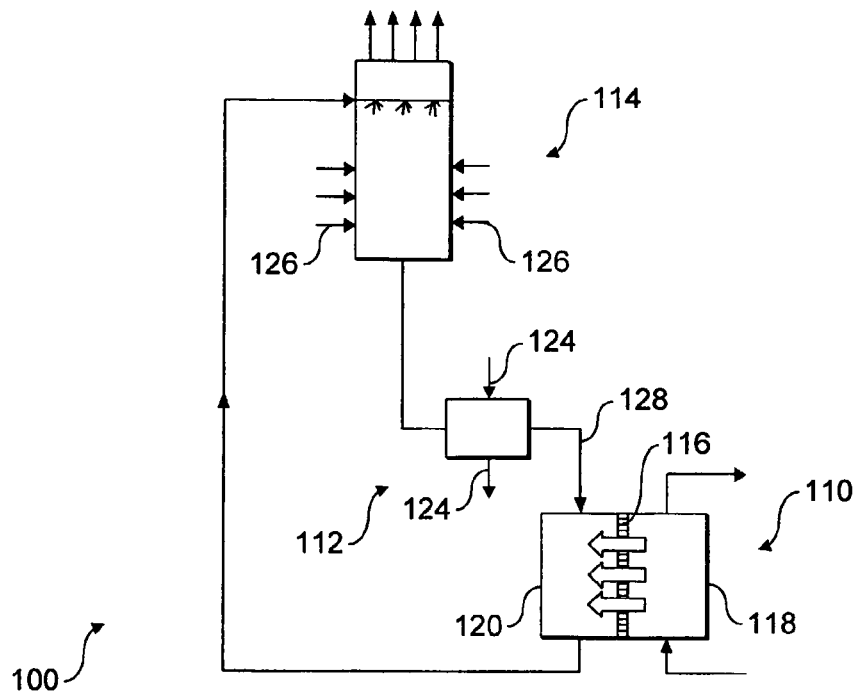
FIG. 3 is a schematic diagram of an apparatus according to a third embodiment of the present invention.

In FIG. 3, there is provided an apparatus 100 for removing heat from an industrial process stream.

The apparatus 100 comprises a housing 110, a heat exchanger 112 and a cooling tower 114. The housing 110 comprises a selectively permeable membrane 116 for separating seawater 118 from a solution 120 formed by dissolving a known amount of sodium chloride in water.

In use, seawater 118 is circulated through the housing 110 on one side of the membrane 116, whilst sodium chloride solution 120 is circulated through the housing 110 on the opposite side of the membrane 116. The sodium chloride solution 120 in contact with the membrane 116 has a higher total dissolved salt (solute) concentration than the seawater 118. Thus, water flows from the seawater-side of the membrane 116 to the solution-side of the membrane 116 by osmosis.

The flow of water across the membrane 116 dilutes the sodium chloride solution 120. This diluted solution 120 is introduced into the cooling tower 114. The cooling tower 114 contains a porous filler material, known as decking (not shown). The solution 120 is introduced into the top of the cooling tower 114 and drips down through the decking, whilst cool air 126 is blown through the decking, causing some of the water from the solution 120 to evaporate. The loss of heat by evaporation (evaporative cooling) lowers the temperature of the remaining solution 120. The remaining solution, however, is more concentrated than the solution entering the cooling tower 114 because of the loss of water by evaporation.

The cooled solution 120 is introduced into the heat exchanger 112. In the heat exchanger 112, the solution 120 used as a coolant to remove heat from an industrial process stream 124. Heat from the stream 124 is transferred to the solution 120 through the walls of the heat exchanger 112. Thus, the temperature of solution 120 is increased.

The solution 120 is withdrawn from the heat exchanger 124 via line 128 and reintroduced to the solution-side of the membrane 116 in a closed loop. The concentration of the solution 120 in contact with the membrane 116 is higher than that of the seawater 118 on the other side of the membrane 116.

Figure 4:
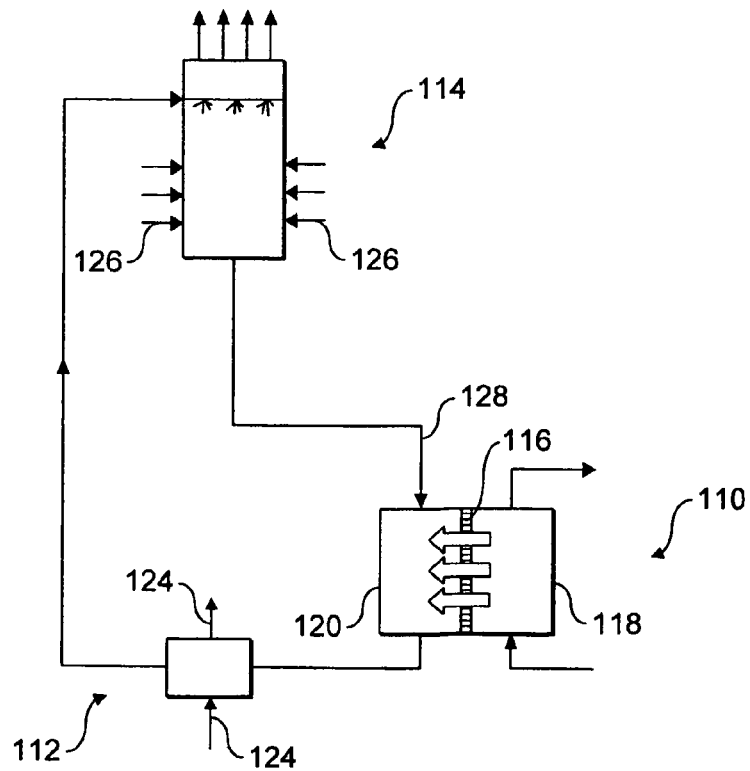
FIG. 4 is a schematic diagram of an apparatus according to a fourth embodiment of the present invention.

The apparatus of FIG. 4 is similar to the apparatus of FIG. 3. Thus, like numerals have been used to designate like parts. Unlike the apparatus of FIG. 3, solution 120 from the housing 110 is introduced into the heat exchanger 112 before it is introduced into the cooling tower 114.

The invention claimed is:

1. A process for introducing a solution into an evaporative cooling apparatus, said process comprising the steps of:
    a) providing a first solution selected from the group consisting of seawater, brackish water, river water and waste water,
    b) forming a second solution by dissolving a solute in water having a higher solute concentration than the first solution,
    c) positioning a selectively permeable membrane between a first solution and a second solution having a higher solute concentration than the first solution, such that the solvent form the first solution flows across the selectively permeable membrane to dilute the second solution,
    d) introducing the second solution into the evaporative cooling apparatus in which solvent is removed from the second solution by evaporation, and
    e) recycling the second solution from step d) to step c) to draw solvent from the first solution.

2. The process as claimed in claim 1, wherein in step e) the second solution is recirculated through at least steps c) and d) in a closed loop.

3. The process as claimed in claim 1, including after step c), a step f) contacting the second solution with a heat source to remove heat from the heat source.

4. The process as claimed in claim 3, wherein the second solution is used as a coolant in a heat exchanger to remove heat from the heat source.

5. The process as claimed in claim 3, wherein in step e) the second solution is recirculated through at least steps c), d) and f) in a closed loop.

6. The process as claimed in claim 3, wherein step f) is carried out after step d).

7. The process as claimed in claim 1, wherein the evaporative cooling apparatus comprises an air cooler.

8. The process as claimed in claim 1, wherein the evaporative cooling apparatus comprises a cooling tower.

9. The process as claimed in claim 1, wherein the second solution comprises seawater, brackish water and/or water from an industrial process.

10. The process as claimed in claim 1, wherein the solute introduced into the second solution is a water-soluble solute.

11. The process as claimed in claim 1, wherein the solute introduced in the second solution is a salt of ammonia, alkali earth metal and/or an alkaline earth metal.

12. The process as claimed in claim 11, wherein the salt is a fluoride, chloride, bromide, iodide, sulphate, sulphite, sulphide, carbonate, bicarbonate, carbamate, hydrogencarbonate, nitrate, nitrite, nitride, phosphate, aluminate, borate, bromate, carbide, chloride, perchlorate, hypochlorate, chromate, fluorosilicate, fluorosilicate, fluorosulphate, silicate, cyanide and/or cyanate.

13. The process as claimed in claim 1, wherein the first and/or second solution comprises additives selected from at least one scale inhibitor, corrosion inhibitor, biocide, or dispersant.

14. The process as claimed in claim 1, wherein the pressure generated by the flow of solvent across the membrane in step c) is used to aid the transfer of the second solution to step d).

15. The process as claimed in claim 1, wherein step c) includes
    positioning a selectively permeable membrane between the diluted second solution and a further solution having a higher solute concentration than the diluted second solution, such that the solvent from the diluted second solution flows across the selectively permeable membrane to dilute the further solution.

* * * * *